United States Patent [19]
Platt

[11] Patent Number: 5,802,073
[45] Date of Patent: Sep. 1, 1998

[54] BUILT-IN SELF TEST FUNCTIONAL SYSTEM BLOCK FOR UTOPIA INTERFACE

[75] Inventor: Alfred Platt, Cupertino, Calif.

[73] Assignee: VLSI Technology, Inc., San Jose, Calif.

[21] Appl. No.: 868,853

[22] Filed: Jun. 4, 1997

Related U.S. Application Data

[63] Continuation of Ser. No. 311,623, Sep. 23, 1994, abandoned.
[51] Int. Cl.$^6$ .................................................. G01R 31/28
[52] U.S. Cl. .................................. 371/22.5; 370/242
[58] Field of Search ............................... 371/20.1, 20.2, 371/20.4, 20.5, 20.6, 22.4, 22.5, 22.6, 67.1, 68.1, 68.2, 22.33, 27.1, 27.5, 37.02, 47.1; 370/241, 242, 243, 244, 245, 246, 248, 249, 250; 395/183.06, 183.15

[56] References Cited

U.S. PATENT DOCUMENTS

| | | | |
|---|---|---|---|
| 3,562,710 | 2/1971 | Halleck | 371/5.1 |
| 4,534,030 | 8/1985 | Paez et al. | 371/22.4 |
| 4,594,711 | 6/1986 | Thatte | 371/22.3 |
| 4,745,355 | 5/1988 | Eichelberger et al. | 371/22.3 |
| 4,817,093 | 3/1989 | Jacobs et al. | 371/22.3 |
| 4,897,842 | 1/1990 | Herz et al. | 371/22.4 |
| 5,132,975 | 7/1992 | Avaneas | 371/37.6 |
| 5,228,040 | 7/1993 | Agrawal et al. | 371/22.1 |
| 5,228,042 | 7/1993 | Gauthier et al. | 371/20.5 |
| 5,230,000 | 7/1993 | Mozingo et al. | 371/22.4 |
| 5,251,204 | 10/1993 | Izawa et al. | 370/15 |

*Primary Examiner*—Robert W. Beausoliel, Jr.
*Assistant Examiner*—Nadeem Iqbal
*Attorney, Agent, or Firm*—Patrick T. King

[57] ABSTRACT

An apparatus and method for providing a built-in self-test functional system block (BIST FSB) for self-testing a network interface integrated circuit having a Universal Test & Operations PHY Interface for ATM (UTOPIA) interface. The BIST FSB includes a random number generator, a signature analyzer, two cell counters, and a state machine for controlling the BIST FSB. Means are provided for looping the transmitter of the network interface integrated circuit back to the receiver of the network interface integrated circuit. When the BIST test is started, the state machine waits until the receiver is synchronized. Then user cells are generated and fed to the transmitter for the network interface integrated circuit. At the same time, cells on the receive side are collected and compressed into a signature. When all of the cells have been received, the signature is compared with a precalculated signature. If the signatures match, the test is passed. The BIST FSB in its self-test mode disables user data from entering the network interface integrated circuit and inserts its own data from a random number generator. The BIST monitors data going from the network interface integrated circuit receiver back to BIST. This data is "compressed" into one number and compared with a predetermined signature in a signature analyzer.

2 Claims, 4 Drawing Sheets

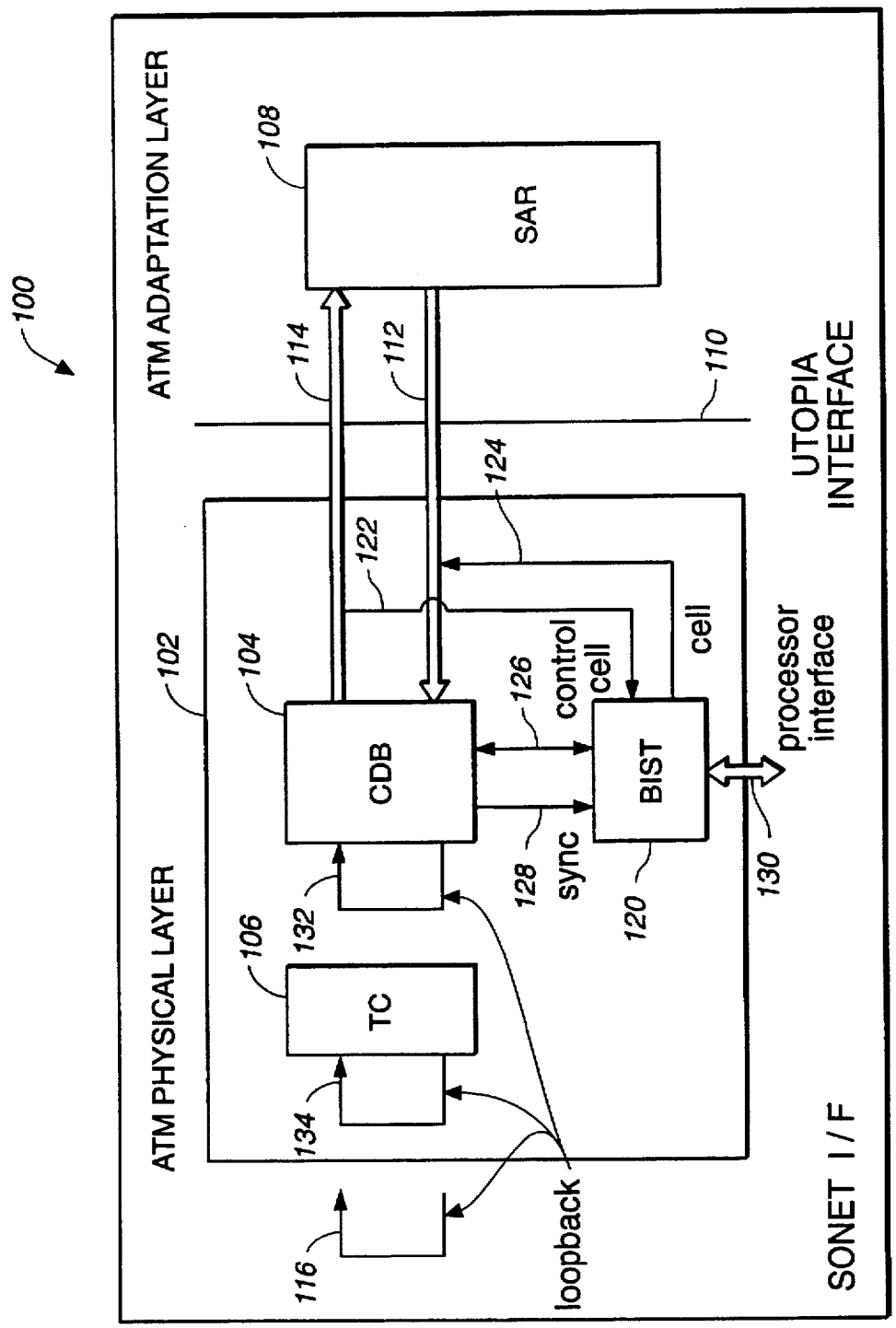
FIG._1A

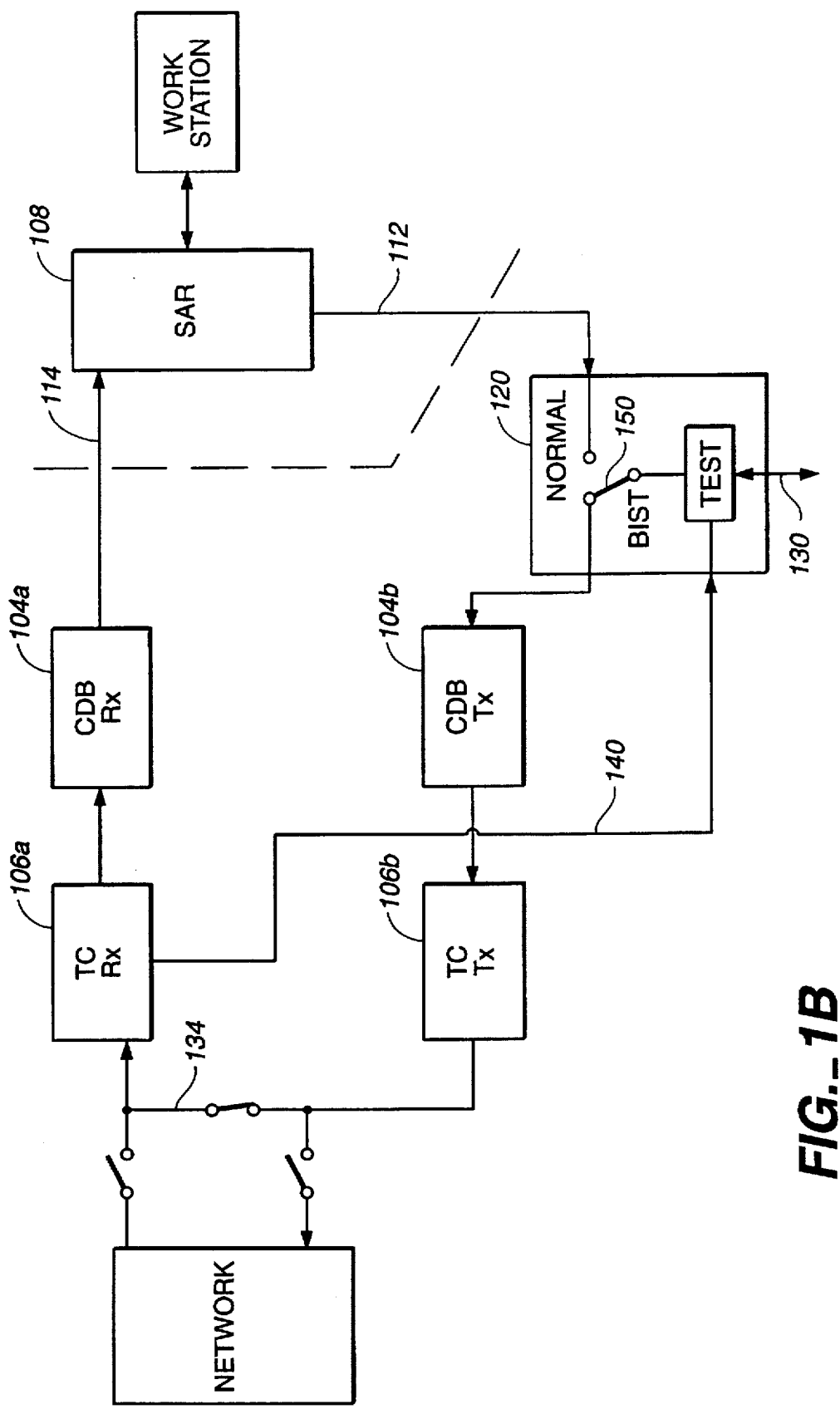
FIG._1B

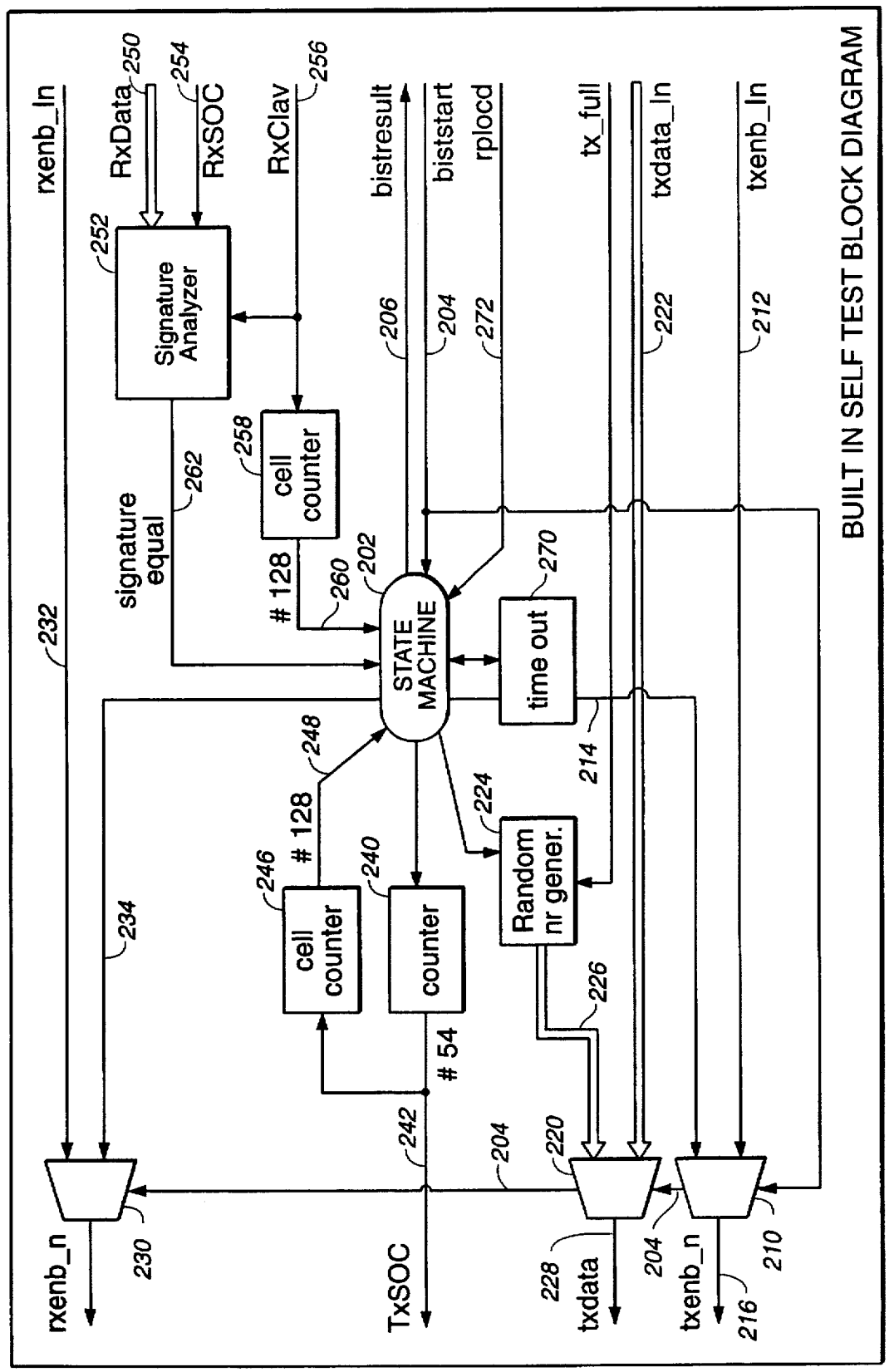
FIG._2

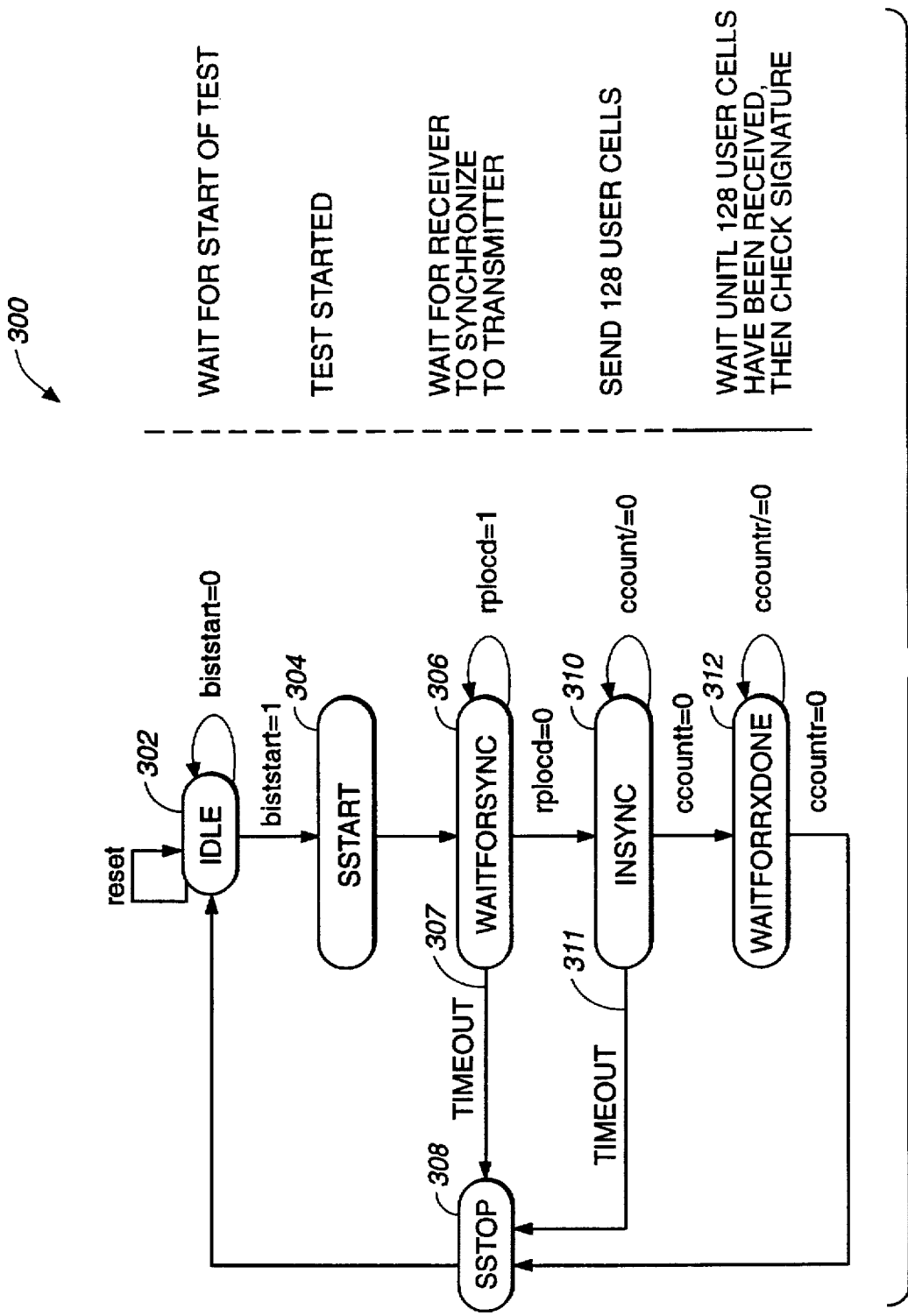
FIG._3

BUILT-IN SELF TEST FUNCTIONAL SYSTEM BLOCK FOR UTOPIA INTERFACE

This application is a file wrapper continuation of application Ser. No. 08/311,623 filed Sep. 23, 1994, now abandoned.

TECHNICAL FIELD

BACKGROUND OF THE INVENTION

Testing of complex integrated circuits while in a system is a difficult problem. Usually integrated circuit chips have test-logic circuits built in so that they can be tested in the fabrication facility of a manufacturer by, for example, internal scan logic.

For in-system testing where an integrated circuit is mounted, for example, on a printed circuit board or the like, boundary scan testing logic is built into the integrated circuit chip.

For particular types of integrated circuits, such as RAMs, ROMs, etc., there are various types of built-in self-test designs. All of these built in test logic techniques lack the ability to run diagnostic tests while the integrated circuit is in the system.

Traditionally, diagnostic tests are done by writing software or firmware which is later executed in the system by a microprocessor. This requires the presence of a microprocessor, which is usually not a significant problem. However, a significant problem is that in a large system the execution of diagnostic tests can require a significant amount of microprocessor time and capability.

The prior art includes two methods. In one method provisions are made for manufacturing tests which do not allow for testing a chip in a system and at operating speed. The second method is to create software for a diagnostic test and execute the software in the system. The two alternatives for testing an integrated circuit, either no diagnostic testing or else spending significant amounts of microprocessor time and capability are not satisfactory.

Thus, a need exists for an improved technique for diagnostically testing an integrated circuit in a system.

SUMMARY OF THE INVENTION

It is, therefore, an object of the present invention to provide an in-system diagnostic test for an integrated circuit.

In accordance with this and other objects of the invention, a built in system testing (BIST) technique is provided which uses a functional system block (FSB) within an integrated circuit for in-system diagnostic testing of an integrated circuit. The BIST FSB according to the invention executes an in-system chip test at system speed at a functional level (as opposed to gate level). An improvement over the prior art is the ability to run a chip diagnostic test in the system at operating speed without any additional outside resources.

An objective of the invention is to achieve a high percentage of fault coverage for the whole chip with a low area penalty. An in-system chip test is executed independently of outside activities except for the setup phase. The in-system chip test indicates "test passed/not passed" upon completion. If the test is not passed, the chip is considered to be defective.

In accordance with these and other objects and objectives, a built-in self-test functional system block (BIST FSB) is provided for self-testing a network interface integrated circuit having a Universal Test & Operations PHYInterface for ATM (UTOPIA) interface. The BIST FSB includes a random number generator, a signature analyzer, two cell counters, and a state machine for controlling the BIST FSB. Means are provided for looping the transmit data of the network interface integrated circuit back to the receiver of the network interface integrated circuit. When the BIST test is started, the state machine waits until the receiver is synchronized. Then user cells are generated and fed to the transmitter for the network interface integrated circuit. At the same time, cells on the receive side are collected and compressed into a signature. When all of the cells have been received, the signature is compared with a precalculated signature. If the signatures match, the test is passed.

The BIST FSB in its self-test mode disables user data from entering the network interface integrated circuit and inserts its own data from a random number generator. The BIST monitors data going from the network interface integrated circuit receiver back to BIST. This data is "compressed" into one number and compared with a predetermined signature in a signature analyzer.

A method of self-testing a network interface integrated circuit having a Universal Test & Operations PHYInterface for ATM (UTOPIA) interface is provided which comprises the steps of: sending 128 cells with a transmitted signature; receiving 128 receiver cells with a received signature; comparing the transmitted signature with the received signature. The method also includes the steps of: waiting for start of a test; starting the test; and waiting for a receiver to synchronize with a transmitter. The step of waiting for start of a test includes a first timeout step and the step of waiting for a receiver to synchronize with a transmitter includes a second timeout step.

According to another aspect of the invention, a method of self-testing a network interface integrated circuit having a Universal Test & Operations PHYInterface for ATM (UTOPIA) interface comprises the steps of: generating a sequence of user cells with random content, said generated sequence of user cells having a signature; transmitting said sequence of generated user cells from transmitter means of the network interface integrated circuit; receiving the transmitted sequence of user cells; compressing the received sequence of user cells into a received sequence signature; and comparing the received sequence signature with the signature of the generated sequence of user cells.

The method includes the step of generating a signal indicating that the network interface integrated circuit has passed the self test if the received sequence signature compares with the signature of the generated sequence of user cells. The method also includes the step of controlling the operation of the steps with a state machine and the further step of having the state machine wait until the receiving of the transmitted sequence of user cells is synchronized with the transmitted sequence of generated user cells.

Apparatus according to the invention includes a built-in self-test functional system block for self-testing a network interface integrated circuit having a Universal Test & Operations PHYInterface for ATM (UTOPIA) interface. The system includes a pseudo-random test signal generator for generating a test signal; means for routing the test signal through the network interface integrated circuit to provide a received signal; a signature analyzer for comparing the signature of the test signal with the signature of the received signal routed through the network interface integrated circuit; and a state machine means for controlling the operation of the pseudo-random test signal generator; the means for routing the test signal through the network interface integrated circuit, and the signature analyzer.

A transmitter counter means is provided for counting the number of cells transmitted from the pseudo-random test signal generator. Receiver counting means are provided for counting the number of cells received from the pseudo-random test signal generator.

Multiplexing means are included for providing normal routing of transmit and received signal through the network interface of transmit and received signal through the network interface integrated circuit and for providing loopback of the test signal through the network interface integrated circuit. Timeout means prevent system hangup in the test mode.

BRIEF DESCRIPTION OF THE DRAWINGS

The accompanying drawings which are incorporated in and form a part of this specification, illustrate embodiments of the invention and, together with the description, serve to explain the principles of the invention:

FIG. 1A is a system block diagram showing a User Network Interface (UNI) integrated circuit, which contains a BIST FSB, where the UNI services an external network and where the UNI interfaces with a Segmentation and Reassembly SAR chip through a Universal Test & Operations PHYInterface for ATM (UTOPIA).

FIG. 1B is a more detailed system block diagram of a UNI which contains a BIST FSB.

FIG. 2 is a block diagram of a BIST FSB.

FIG. 3 is a state diagram of the BIST FSB.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

FIG. 1A is a system block diagram 100 showing a User Network Interface (UNI) integrated circuit 102, which includes a Cell Delineation Block (CDB) 104 and a Transmission Convergence (TC) Block 106. The UNI 102 interfaces with a Segmentation and Reassembly SAR (SAR) integrated circuit 108 through an interface called a Universal Test & Operations PHYInterface for ATM (UTOPIA) interface, as indicated by the line 110. UTOPIA is a standardized bus interface that ensures interoperability of multiple PHY components with a common ATM layer device. Data to the CDB 104 from the SAR 108 is handled by a bus 112. Data from the CDB 104 to the SAR 108 is handled by a bus 114. The UNI 102 services an external network, as indicated by the line 116.

The UNI integrated circuit 102 also includes a built-in self-test (BIST) functional system block (FSB) 120, according to the present invention. The BIST FSB 120 is connected to the data buses 114, 112 of the UTOPIA bus interface 110 using the respective buses 122, 124. Control signals are passed between the BIST FSB 120 and the CDB 104 on a control bus 126. Synchronization signals are supplied from the CDB 104 to the BIST FSB 120 on a sync bus 128. The BIST FSB 120 has a processor interface bus 130, through which a processor controls the BIST FSB 120 and through which the BIST FSB 120 reports back the test results to the processor.

The BIST FSB 120 includes a state machine for control of the testing process, a cell generator which generates different user cells, and a signature analyzer that compresses the contents of the returning cells and compares it to a hardwired signature at the end of the test.

In order for the self test process to function, the CDB 104 to be tested needs a signal "loopback" capability which essentially connects its transmitter output terminal to its receiver input terminal. Before the test is started, the link is put into a loopback mode. There are several points in the link where a loopback can be established. As indicated in FIG. 1, any one of three interfaces can be chosen for loopback: loopback 132 at the CDB 104, loopback 134 at the TC 106, and the network loopback 116.

The BIST FSB 120 is designed such that, when starting the self-test sequence, the state machine of the BIST FSB 120 waits (with a timeout) until the receiver of the CDB 104 receiver has synchronized to the transmitter to make sure that a link is established. This link can be internal to the SAR only, or if provisions are made at the far network end, the whole link to a SONET Network. Once the link is established, the BIST FSB 120 injects user cells. The user cells have different headers with and without single-bit errors in order to test the error correction unit and the user cells have random data in the payload portion of the cells. While sending cells, the BIST FSB 120 waits for the same cells to loop back and compresses the received data. After a certain number of user cells have been sent, the BIST FSB 120 waits (with a time-out) for all the cells to loop back and then tests the signature after the time-out.

The BIST FSB 120 is a "high level" test process that does not generate vectors for a specific gate level implementation. Instead, the BIST FSB 120 generates high level functional vectors only. This way it emulates the ATM Adaptation Layer functions with the UTOPIA interface. This testing scheme makes no assumptions regarding which mode the link is operating in (cell length, scrambler on/off, etc.) because the BIST FSB 120 functions regardless of how the link is set up.

FIG. 1B shows a more detailed system block diagram of a UNI 102 which contains a BIST FSB 120. Data to the CDB Transmitter 104b from the SAR 108 is handled by the bus 112. A switch 150 in the BIST FSB 120 is placed in a normal position to connect the bus 112 to the input terminals of a CDB Transmitter 104b. For operation of the BIST test function, the switch 150 is placed in the BIST position to connect the BIST test circuits to the input terminals of the CDB Transmitter 104b. The output terminals of the CDB transmitter 104b are connected to the input terminals of the TC transmitter 106b. The switches at the output terminals of the TC transmitter 106b are arranged for a signal loopback to the input terminals of the TC receiver 106a. The output signals of the TC receiver 106a are connected back to input terminals of the BIST FSB through a bus 140, as shown in the FIG. 1B.

FIG. 2 shows a block diagram of a BIST FSB 200 with a state machine 202. The BIST FSB 200 has two principle functions. One function is that, in a self-test mode, the BIST disables user data going from the SAR 108 to the CDB Transmitter 104b and inserts its own data from a random number generator 224. The other function is that the BIST monitors data going from the TC receiver 106a back to BIST. This data is "compressed" into one number and compared with a predetermined signature in a signature analyzer 252.

The state machine is controlled by a processor using a processor interface bus 130, shown in FIG. 1B. The state machine 202 is started with a biststart signal from the processor on control line 204. The state machine 202 of the BIST FSB 120 reports back the test results to the processor as the state of the bistresult on signal line 206.

The biststart signal at a ONE level on line 204 from the processor also sets three multiplexers (210, 220, 230) to place the UNI chip 102 in the self-test mode of operation as illustrated in FIG. 1B.

A first multiplexer 210 has one input terminal provided with a txenb_ln signal provided on a control signal line 212. The other input terminal of the first multiplexer 210 has an output signal from a timeout circuit provided on a signal line 214. The output signal of the first multiplexer 210 on a signal line 216 is a txenb_n signal which indicates that the transmitted data is valid.

A second multiplexer 220 also controlled by the biststart signal on line 204 has one input terminal provided with a txdata_ln signal provided on a control signal line 222. The other input terminal of the second multiplexer 220 has an output signal from a pseudo-random number generator 224 provided on a signal line 226. The output signal of the second multiplexer 220 on a bus 228 is a txdata signal.

A third multiplexer 230 also controlled by the biststart signal on line 204 has one input terminal provided with a rxenb_ln signal provided on a control signal line 232. The output signal from the third multiplexer 230 is a rxenb_n signal. The other input terminal of the third multiplexer 230 has an input signal provided on signal line 234 from the state machine 202.

In an ATM system data is formed into data cells which comprise fifty-four 8-bit bytes. A byte counter 240 with its input terminal connected to the state machine 202 counts 54 bytes to provide an output signal pulse TxSoc on a signal line 242 to start transmission of a data cell. A cell counter 246 counts the TxSoc pulses and after 128 of them provides an output signal on a signal line 248 to the state machine 202.

The txdata on the bus 228 is routed through the TC transmitter 106b and the TC receiver 106a back to the RXData data bus 250 of the BIST. The data bus 250 inputs data to a signature analyzer circuit 252, which checks the signature for the 128 user cells sent from the random number generator 224. A RxSoc signal is provided on a line 254. A RxClav signal indicating the start of receipt of a cell is provided on a signal line 256 to an input terminal of the signature analyzer 252. A received cell counter 258 counts 128 of the received cells and provides an output signal on a signal line 260 to the state machine 202. A signal is provided on the signal line 262 from the output terminal of the signature analyzer 252 to the state machine when the transmitted and received signatures are equal. The state machine 202 asserts a bistresult signal at a ONE level on line 206 if the signatures are equal.

Timeout functions are provided to the state machine using a timeout module 270, as described herein below. A rplocd signal on a signal line 272 is set to a ONE level if the receiver is synchronized to the transmitter. If synchronization does not occur within a specified time, such as, for example, 100 milliseconds, a first timeout occurs, as described herein below.

TERMINALS for the BIST FSB:

| | |
|---|---|
| rxenb_in | control signal 1 - Rx data valid/enable(4) |
| RxData | cell data |
| RxSoc | Receive start of cell |
| RxClav | Receive cell available; counts the number of cells |
| bistresult | processor interface compares signatures, if equal bistresult=1, if unequal bistresult=0 |
| biststart | processor interface, start the self test |
| rplocd sync | 0=sync; 1/=sync |
| tx_full | Transmitter full indication |
| txdata_in | cell data for transmitter |
| rxenb_n | control signal - Rx data valid/enable (4) |
| TxSoc | control signal - tx start of cell |
| txdata | cell data transmitter |
| txenb_n | control signal - tx data valid/enable(4) |

FIG. 3 shows a state diagram 300 for the operation of the BIST testing process. An idle block 302 is the idle state in which the BIST remains, waiting for the start of a test. The BIST system remains in the idle state while the logic signal bisstart is in the ZERO state. When the logic signal biststart goes to a ONE state, the process moves to a sstart block 304, which is the starting state for the testing process. The process then moves to a waitforsync block 306, which is the state in which the process waits for the receiver to synchronize to the transmitter while the rploed logic signal remains in the ONE state. If synchronization does not occur within a specified time, such as, for example, 100 milliseconds, a first timeout occurs as indicated by a line 307. A sstop block 308 indicates that the system moves to a stopped state and from which the system then moves back to the idle state of block 302 to await another biststart signal going to a ONE level to initiate another test sequence.

If the rplocd logic signal goes to a ZERO level before the occurrence of the first timeout, the process moves to the insync block 310 which indicates that the BIST system is sending a specific number, for example, 128 of user cells. While this is occurring, the logic signal ccount is not equal to ZERO. If the specific number of user cells are not sent within a specified time such as, for example, 100 milliseconds, a second timeout occurs as indicated by a line 311. The sstop block 308 indicates that the system has moved to a stopped state from which the system moves back to the idle state of block 302 to await another biststart signal going to a ONE level to initiate another test sequence.

If the ccount logic signal goes to a ZERO level before the occurrence of the second timeout, the process moves to the waitforrxdone block 312 which indicates that the BIST system is waiting until 128 user cells have been received and the signature for these 128 user cells is checked. While this is occurring, the ccountr logic signal is not ZERO. After the 128 user cells have been received and the signature for these 128 user cells is checked, the ccountr logic signal is set to ZERO and the process moves to the sstop block 308. The system then moves back to the idle state of block 302 to await another biststart signal going to a ONE level to initiate another test sequence.

In summary, when the BIST process is started, the state machine 300 waits until the receiver is synchronized as indicated by the rplocd logic signal. Then user cells with random contents are generated and fed to the transmitter. At the same time, user cells on the receive side are collected and compressed into a signature. When all of the user cells have been received, their signature is compared with a pre-calculated signature. The test is passed if both of those signatures are equal.

The foregoing descriptions of specific embodiments of the present invention have been presented for the purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

I claim:

1. A method of self-testing a network interface integrated circuit having a Universal Test & Operations PHYInterface for ATM (UTOPIA) interface using a built-in self test block, comprising the steps of:

a) generating in a built-in self test block a sequence of user cells with random content, said generated sequence of user cells having a signature;

b) transmitting said sequence of generated user cells from a transmitter contained in said built-in self test block of the network interface integrated circuit and having a state machine contained in the built-in self test block of the network interface integrated circuit wait until the receiving of the transmitted sequence of user cells is synchronized with the transmitted sequence of generated user cells;

c) receiving the transmitted sequence of user cells with a receiver also contained in the built-in self test block of the network interface integrated circuit;

d) compressing the received sequence of user cells into a received sequence signature;

e) comparing in the built-in self test block of the network interface integrated circuit the received sequence signature with the signature of the generated sequence of user cells to determine an error in transmission through the network interface integrated circuit;

f) generating a signal indicating that the network interface integrated circuit has passed a self test if the received sequence signature is the same as the signature of the generated sequence of user cells;

g) controlling the operation of the steps of generating, transmitting receiving, compressing, and comparing with a state machine contained within the built-in self test block of the network interface integrated circuit.

2. A built-in self-test functional system block for self-testing a network interface integrated circuit having a Universal Test & Operations PHYInterface for ATM (UTOPIA) interface, comprising:

a pseudo-random test signal generator for generating a test signal having a signature, said pseudo-random test signal generator being contained in a built-in self-test functional system block of a network interface integrated circuit;

means for routing the test signal through the network interface integrated circuit to provide a received signal;

means for generating a received-signal signature from the received signal;

a signature analyzer contained in said built-in self-test functional system block of the network interface integrated circuit for comparing the signature of the test signal with the signature of the received signal routed through the network interface integrated circuit;

state machine means contained in said built-in self-test functional system block of the network interface integrated circuit for controlling the operation of the pseudo-random test signal generator, for controlling the means for routing the test signal through the network interface integrated circuit, and for controlling the signature analyzer;

transmitter counter means contained in said built-in self-test functional system block of the network interface integrated circuit for counting the number of cells transmitted from the pseudo-random test signal generator;

receiver counting means contained in the built-in test functional system block of the network interface integrated circuit for counting the number of cells received from the pseudo-random test signal generator;

timeout means contained in the built-in test functional system block of the network interface integrated circuit for providing normal routing of transmit and received signals through the network interface integrated circuit;

multiplexing means contained in said built-in self-test functional system block of the network interface integrated circuit for providing normal routing of transmit and received signal through the network interface integrated circuit and for providing loopback of the test signal through the network interface integrated circuit.

* * * * *